US007228416B2

(12) United States Patent
Nishizawa et al.

(10) Patent No.: US 7,228,416 B2
(45) Date of Patent: Jun. 5, 2007

(54) DATABASE ACCESS METHOD AND SYSTEM CAPABLE OF CONCEALING THE CONTENTS OF QUERY

(75) Inventors: Itaru Nishizawa, Koganei (JP); Kazutomo Ushijima, Kokubunji (JP); Takahiko Shintani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1125 days.

(21) Appl. No.: 09/941,850

(22) Filed: Aug. 30, 2001

(65) Prior Publication Data

US 2002/0104002 A1 Aug. 1, 2002

(30) Foreign Application Priority Data

Jan. 26, 2001 (JP) ............................. 2001-017827

(51) Int. Cl.
*G06F 17/00* (2006.01)
(52) U.S. Cl. ..................... 713/168; 713/150; 713/153
(58) Field of Classification Search ............... 713/168, 713/150, 153; 709/225; 707/10
See application file for complete search history.

(56) References Cited

U.S. PATENT DOCUMENTS

| 5,963,642 | A | | 10/1999 | Goldstein | |
|---|---|---|---|---|---|
| 6,023,506 | A | * | 2/2000 | Ote et al. ................ | 713/165 |
| 6,148,342 | A | * | 11/2000 | Ho ............................ | 709/225 |
| 6,366,915 | B1 | * | 4/2002 | Rubert et al. ............. | 707/10 |

FOREIGN PATENT DOCUMENTS

| JP | 64014665 | 1/1989 |
|---|---|---|
| JP | 11259512 | 9/1999 |
| JP | 11272681 | 10/1999 |
| JP | 2001 109758 | 4/2001 |

OTHER PUBLICATIONS

Camouflage of network traffic to resist attack (CONTRA); Weinstein, W.; Lepanto, J.; DARPA Information Survivability Conference and Exposition, 2003. Proceedings vol. 2, Apr. 22-24, 2003 pp. 126-127 vol. 2.*
Detecting malicious packet dropping using statistically regular traffic patterns in multihop wireless networks that are not bandwidth limited; Rao et al..; Global Telecommunications Conference, 2003. IEEE, vol. 5, 2003 pp. 2957-2961.*
Semsomm-a scalable multiple encryption scheme for one-to-many multicast; Weiler, N.; Enabling Technologies: Infrastructure for Collaborative Enterprises, 2001.Proceedings. Tenth IEEE International Workshops on pp. 231-236.*
Japanese Unexamined Patent Application No. 11-259512.
Japanese Unexamined Patent Application No. 64-014665 (01-014665).
Japanese Unexamined Patent Application No. 11-272681.

* cited by examiner

*Primary Examiner*—David Jung
(74) *Attorney, Agent, or Firm*—Mattingly, Stanger, Malur & Brundidge, P.C.

(57) ABSTRACT

A data relay server connected between a client computer and a database server produces a query message obtained by encrypting a retrieval condition designated by the client computer, and transmits the query message to the database server. The database server encrypts a specific data item which is designated by the retrieval condition and read out from the database, retrieves service information matched with the retrieval condition by encrypted data matching, and replies the service information as a retrieval result to the data relay server.

12 Claims, 10 Drawing Sheets

114 RETRIEVAL MANAGEMENT TABLE

| CLIENT ID | CONTENTS OF ORIGINAL QUERY | CONTENTS OF CONVERTED QUERY | TYPE OF CONVERSION | 1:1 CONVERSION FLAG | |
|---|---|---|---|---|---|
| | | | | | ← EN-1 |
| | | | | | ← EN-2 |
| | | | | | |

801 SAVING BALANCE TABLE

| CUSTOMER ID | BRANCH | SAVING AMOUNT |
|---|---|---|
| 060001895 | SINJUKU | 1,050,000 |
| 061089288 | IKEBUKURO | 125,000 |
| 060102952 | SINJUKU | 120,000 |
| ------------ | ------- | ------- |

QUERY Q1:
    SELECT CUSTOMER ID, BRANCH, SAVING AMOUNT
        FROM SAVING BALANCE TABLE
        WHERE SAVING AMOUNT >= 1,000,000 ;   } 805

FIG. 7C

QUERY Q2:
    SELECT CUSTOMER ID, SAVING AMOUNT
        FROM SAVING BALANCE TABLE
        WHERE SAVING AMOUNT <= 10,000 ;   } 806

FIG. 7D

LINKED QUERY:
    SELECT CUSTOMER ID, BRANCH, SAVING AMOUNT
        FROM SAVING BALANCE TABLE
        WHERE SAVING AMOUNT >= 1,000,000 OR
        SAVING AMOUNT <= 10,000 ;   } 807

FIG. 7E

DISTRIBUTIVE QUERY DQ1:
    SELECT CUSTOMER ID, BRANCH, SAVING AMOUNT
        FROM SAVING BALANCE TABLE
        WHERE ( SAVING AMOUNT >= 1,000,000 OR
        SAVING AMOUNT <= 10,000 )
        AND BRANCH = 'SINJUKU' ;   } 808

FIG. 7F

DISTRIBUTIVE QUERY DQ2:
    SELECT CUSTOMER ID, BRANCH, SAVING AMOUNT
        FROM SAVING BALANCE TABLE
        WHERE ( SAVING AMOUNT >= 1,000,000 OR
        SAVING AMOUNT <= 10,000 )
        AND BRANCH <> 'SINJUKU' ;   } 809

901 GENE ARRANGEMENT TABLE

| NAME (902) | RELATED LINK (903) | ARRANGEMENT STRUCTURE (904) |
|---|---|---|
| abcd | site A | atcg |
| efgh | site B | tggctg |
| ijkl | site C | ccttt |
| --- | --- | --- |

FIG. 9B

QUERY Q3:
    SELECT NAME, RELATED LINK
        FROM GENE ARRANGEMENT TABLE
        WHERE ARRANGEMENT STRUCTURE = 'atcg'; } 905

FIG. 9C

QUERY Q4:
    SELECT NAME, RELATED LINK, ARRANGEMENT STRUCTURE
        FROM GENE ARRANGEMENT TABLE
        WHERE ARRANGEMENT STRUCTURE = '@2aSzE'; } 906

FIG. 10

Tc : DATA ITEM TO BE CONCEALED
fe ( ) : ENCRYPTION FUNCTION
vb : ORIGINAL DATA VALUE
va : ENCRYPTED DATA VALUE

DATABASE ACCESS METHOD AND SYSTEM CAPABLE OF CONCEALING THE CONTENTS OF QUERY

BACKGROUND OF THE INVENTION

1. Field of the Invention

The present invention relates to a database access method and system and, more particularly, a database access method and a data retrieval system, especially, a data relay server and a database server system capable of concealing the contents of a query for data retrieval requested from the user or an application program from the manager of a database.

2. Description of the Related Art

With the advance and spread of the network technology such as the Internet, an increasing number of computers are connected to networks. In association with this, information providing service of providing various information to the users via networks is being widely used. Good examples of the information providing service are a patent information retrieval system and a gene arrangement information retrieval system.

The users of such information providing service access computers providing the information service via networks from various computers or terminals. In the following description, the computer or terminal operated by the user will be called a client computer, and the computer for providing information service will be called a server computer or DB server. Under the present circumstances, as client computers, a workstation, a personal computer, a small portable terminal, and a portable telephone are often used. As server computers, a mainframe, a UNIX server, and a PC server are often used.

To access the information providing service, the user uses dedicated software or a WEB browser on the client computer. On the other hand, data management and retrieval on the server computer for providing information service are usually performed by a database management system (hereinbelow, called a DBMS).

In an access to information providing service, for example, in the case of retrieving gene arrangement information or patent information, it is desirable for the user that who accessed the information under which conditions can be concealed, that is, confidentiality of the name of the user who accessed the information and the contents of retrieval is ensured for the following reason. In the retrieval of gene arrangement retrieval, patent keyword retrieval, and the like, a condition itself designated by a query is a confidential item, so that retrieval of information while ensuring the confidentiality is important to promote product development and research and development.

By a conventional security technique, for example, (1) protection on communication information against phone tapping on a network and (2) user authentication on the server side to prevent an unauthorized access are realized.

Figure 13:
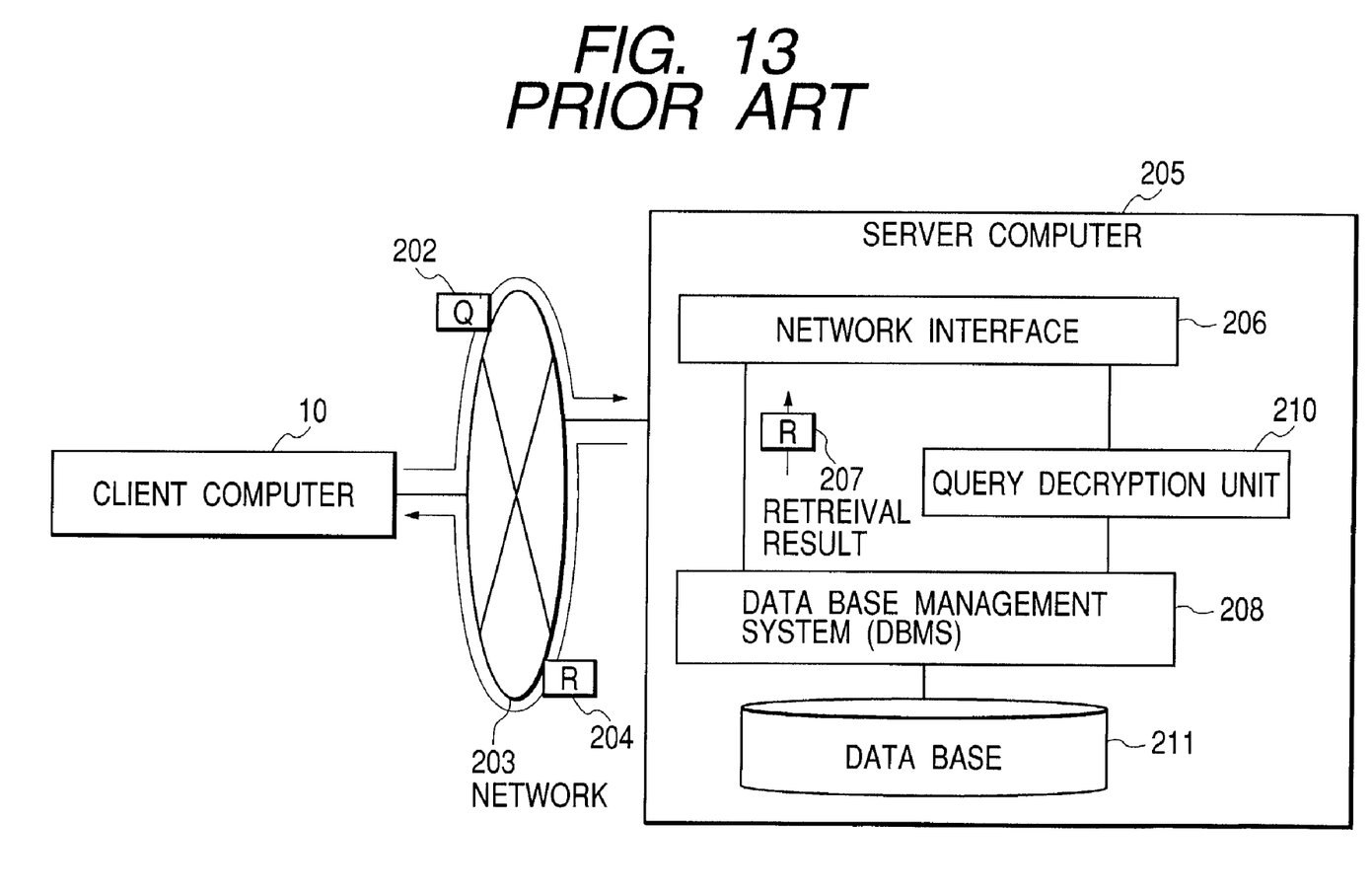
FIG. 13 is a diagram for explaining a conventional data retrieval system using an encrypted query.

Known security realizing methods include a method of using an encryption protocol such as SSL (Secure Socket Layer) between a client computer and a server computer which perform communication with each other and, as shown in FIG. 13, a method of transferring an encrypted inquiry 202 from a client computer 10 via a network 203 to a server computer 205 for providing information service, in the server computer 205, transferring the encrypted inquiry 202 received by a network interface 206 to a query decryption unit 210, decrypting the encrypted inquiry 202 by the query decryption unit 210, and searching a database 211 in accordance with the decrypted inquiry condition by a DBMS 208. A retrieval result 207 is encrypted as necessary, and the encrypted result is sent to the client computer 10 via the network interface 206 and the network 203.

In the conventional method, however, although the inquiry 202 is transferred in the encrypted state on the network, since the searching process is performed in a state where the inquiry is decrypted in the server computer 205, the contents of the retrieval the user wishes to make them confidential is not concealed from the server computer. Consequently, there is a danger that the contents of the retrieval as confidential information are leaked to the ill-intentioned manager on the server side.

In the conventional database access via a network, information is secured on condition that the server is reliable. In the case where a retrieval condition itself designated by a query is the target of confidentiality, it is difficult to make retrieval while concealing the contents of the retrieval from the others.

"Data Retrieval System" disclosed in Japanese Unexamined Patent Application No. 11-259512 (Literature 1) is a system for preventing leakage of confidentiality of the location of the user, retrieval conditions, and the like from history data of a database trace of a retrieval server by (1) eliminating conditions corresponding to pre-registered confidential items from conditions of a query sent from the user, (2) replacing a condition value with a similar term or a broader term by using an inclusive relation (conceptual hierarchy) of the condition value, (3) dividing the input retrieval condition, and (4) allowing a proxy server installed between a data retrieving apparatus and a data retrieval server to access the data retrieval server.

According to the conventional technique disclosed in Literature 1, a part of confidential information of the user can be concealed from the server, but there is a problem such that the retrieval conditions are acquired by the server. For example, in fields where a value of a retrieval condition such as name or gene arrangement is difficult to be replaced with another term by using the inclusive relation, there is a problem such that the retrieval condition cannot be sufficiently concealed.

According to "resident basic register file system" disclosed in Japanese Unexamined Patent Application No. 64-14665 (Literature 2), by encrypting resident basic register data at the time of data input to store the encrypted data into a data file, the resident basic register file is prevented from being accessed to obtain personal information by an ill-intentioned person. In the conventional technique disclosed in Literature 2, when data registered in the resident basic register file is matched with user inquiry data, the encrypted data stored in the data file is decrypted, and the inquiry from the user is not concealed on the server side. If the manager of the server has an ill intention, a problem such that the contents of the query are known by the manager arises.

According to "Method and medium for recording personal information" disclosed in Japanese Unexamined Patent Application No. 11-272681 (Literature 3), in consideration of the problem of Literature 2 that retrieving efficiency in association with data decryption is low and there is a condition which cannot be retrieved according to an encrypting method, a personal information recording method in which it is unnecessary to encrypt whole file data is proposed. According to the method, (1) personal information is divided into a basic information file for storing a basic data item and an attribute information file for storing the other data, (2) a special code for associating the two files with each other is used as a personal code for specifying the personal information, and (3) as necessary, the personal code is encrypted. The conventional technique, however, also has a danger of leakage of the condition on the server side since the retrieval condition designated by the user is not encrypted like the technique of Literature 2.

According to "Method and apparatus for secure storage of data" disclosed in U.S. Pat. No. 5,963,642 (Literature 4), data itself to be stored in a database is converted in a bit map, a query of the user is also converted in a similar bit map, and a retrieval is made by using the bit maps without decrypting the query. In the conventional technique disclosed in Literature 4, however, all of data to be stored in a server has to be preliminarily encoded in the form of a bit map, so that it is difficult to apply the method to an existing database.

SUMMARY OF THE INVENTION

As described above, according to the conventional techniques, in the case of using information providing service function which runs on a server computer from a client computer via a network, it is difficult to receive information service while concealing a confidential retrieval condition designated by the user from the client computer.

A first object of the invention is to provide a database access method and system by which the user can use information providing service while concealing a confidential retrieval condition.

A second object of the invention is to provide a protocol by which information service can be provided while concealing an information retrieving condition.

A third object of the invention is to provide a data relay server and a database retrieval server capable of realizing information providing service while concealing a retrieval condition the user wishes to protect.

In order to achieve the objects, according to the invention, an encrypted query obtained by encrypting at least one data item to be concealed included in a retrieval condition is transmitted to a server computer. In the server computer, without decrypting the encrypted retrieval condition, data retrieval is performed by encrypted data matching while encrypting data to be retrieved is in a manner similar to the data item to be concealed.

According to another aspect of the invention, query conversion such as a query issued by the user is linked with another query or one query is divided into a plurality of queries is performed. By transmitting the converted query to a database server, it is able to change the corresponding relation between the contents of a query remained as history data in the database server and the contents of the query issued from the user.

The query conversion is performed by a data relay server which is connected between client computers and the database server. For example, in the case where one original query is divided into a first query and a second query, the first query is sent from a first data relay server which has received the original query from the client computer to the database server, and the second query is transmitted to the database server via a second data relay server which operates in cooperation with the first data relay server. In this case, a retrieval result for the second query is transferred to the first data relay server via the second data relay server. By performing, in addition to the encryption of the retrieval condition, conversion of the query contents and distribution of the requesters of the queries, analysis of user's confidential information by the database server manager can be made difficult.

DESCRIPTION OF THE PREFERRED EMBODIMENTS

A computer network system realizing information providing service of the invention has: at least one client computer (hereinbelow, called a client) for receiving a data retrieval request or a query from the user; at least one server computer (hereinbelow, called a DB server) for searching a database for information service in accordance with the retrieval request from the client; a network for connecting each client to a desired DB server; and at least one data relay server located between the client and the DB server, for modifying the retrieval request from the client to transfer the modified request to the DB server.

The basic configuration of the data relay server includes: a query analyzing unit for analyzing a query from the client; an encrypted query production unit for encrypting a part of the analyzed query; an encryption program production unit for producing an encryption program for encrypting specific attribute data read out from a database by a DB server; a query message production unit for producing a query message including the encrypted query and, as necessary, to which the encryption program is added and transmitting the query message to a proper DB server; and a retrieval result processing unit for performing, as necessary, re-search or a process of combining a plurality of retrieval results on a retrieval result received from the DB server.

The data relay server may include a query converting unit for converting a plurality of queries output from the query analyzing unit to a linked query or converting a single query output from the query analyzing unit into a plurality of distributive queries to distribute a part of the query to another data relay server which cooperates with the data relay server. The data relay server may have a cache database for holding, as a copy, a part of data stored in the database in the DB server, and a retrieval executing unit for searching the cache database for data in response to a query from a client.

The DB server to which the invention is applied includes: a database for holding data to be provided to the user; a data management and retrieval unit for managing the database and accepting a query; and a data access unit for reading out data from the database in accordance with the contents of the query. When a part of the retrieval condition indicated by the received query is encrypted, the data management and retrieval unit supplies an encryption program received from the data relay server or an encryption program server to the data access unit. In this case, the data access unit reads out stored data having the attribute corresponding to the encrypted retrieval condition while encrypting the data, thereby retrieving the data matched with the retrieval condition through the encrypted data matching.

Figure 1:
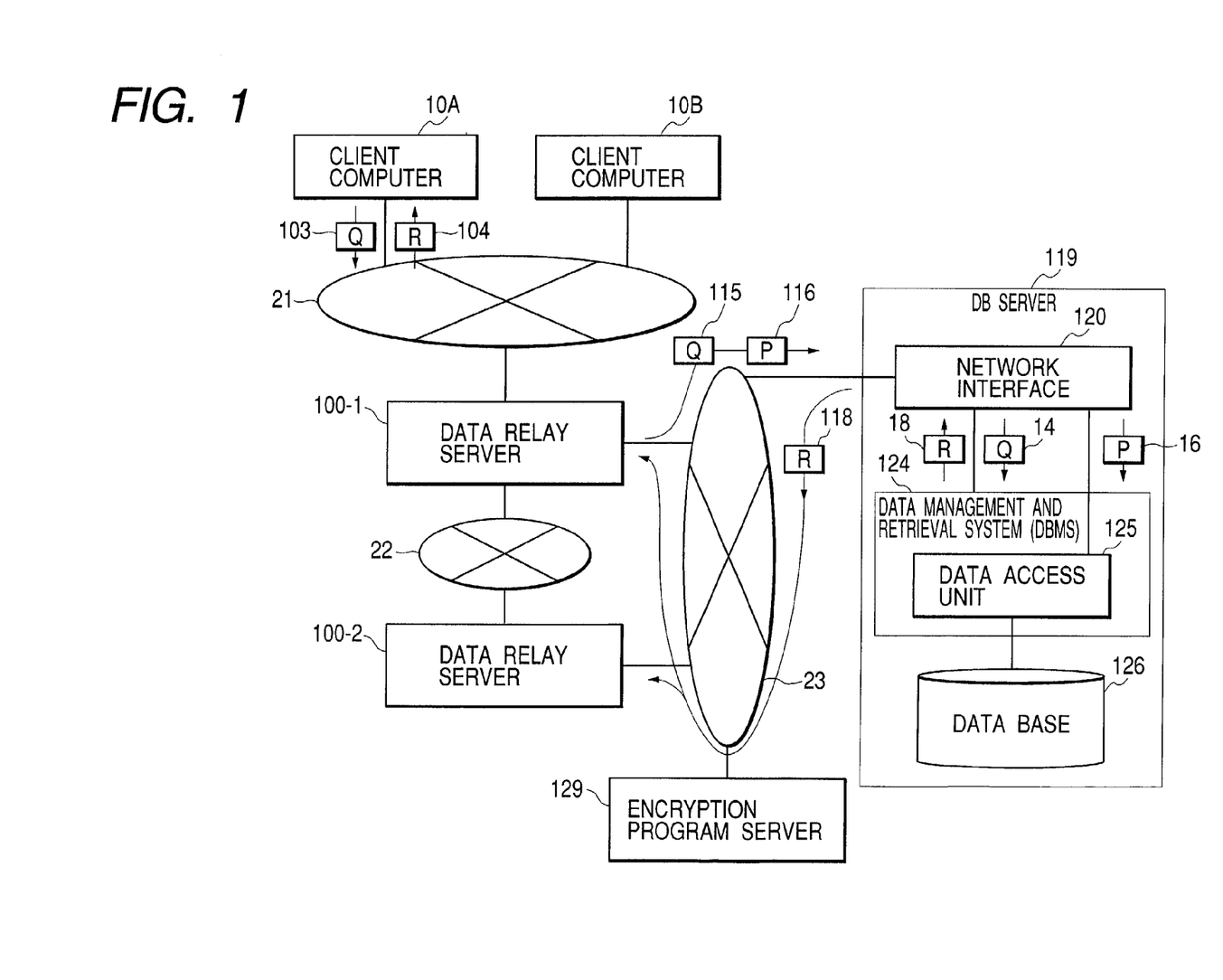
FIG. 1 is a diagram showing an example of a general configuration of a database access system of the invention.

FIG. 1 shows a first embodiment of a computer network system according to the invention.

In FIG. 1, client computers 10 (10A and 10B) are connected to a data relay server 100-1 via a network 21. The data relay server 100-1 is connected to another data relay server 100-2 via a network 22. The data relay servers 100-1 and 100-2 cooperate with each other and are connected to a DB server 119 via a network 23. In a manner similar to the data relay server 100-1, the data relay server 100-2 is connected to a plurality of client computers (not shown). The network 21 may be, for example, the Ethernet, a local area network (LAN) connected via an optical fiber or FDDI, or a wide area network (WAN) including the Internet which operates at speed lower than an LAN.

Usually, the user issues a query to a database system by using a dedicated program or a browser which runs on the client computer 10 and obtains a result to the query. Consequently, in the following description, the client computer 10 will be regarded as the query issuing source and a destination of a final result. The client computer 10 may take the form of, for example, a personal computer such as Hitachi FLORA (TM) of Hitachi Limited, an arbitrary computer system such as Hitachi 3500 Workstation (TM) of Hitachi Limited, a portable terminal such as Persona (TM) of Hitachi Limited, or a portable telephone having a query interface.

Each of the data relay servers 100-1 and 100-2 to which the client computers are connected and the DB server 119 for information providing service may be an arbitrary computer system such as Hitachi 3500 workstation (TM) of Hitachi Limited. Further, a data management and retrieval system 124 which operates for information providing service on the DB server 119 may take the form of a general database management system (DBMS) such as HiRDB (TM) of Hitachi Limited, Oracle 8 (TM) of Oracle Corporation, or DB2 (TM) of IBM Corporation.

Each of the network 22 connecting the data relay servers 100-1 and 100-2 and the network 23 connecting the data relay servers and the DB server 119 may be, for example, the Ethernet, a local area network (LAN) connected via an optical fiber or FDDI, or a wide area network (WAN) including the Internet which operates at speed lower than an LAN.

Although the networks 21, 22, and 23 are independent of each other in this example, they may be a single network. Although two client computers are connected to the data relay server 100-1, the number of client computers is arbitrary. The number of data relay servers connected to the network 22 is also arbitrary. In the embodiment, in consideration of a case where the client computer cannot have an extra processing capability due to limitation of storage capacity, calculation capability, or battery capability like in a small portable terminal, a portable telephone, or the like, the data relay server is disposed between the client computers and the DB server. A part or all of the functions of the data relay server, which will be described hereinlater, may be provided for the client computer.

In the invention, a query message 103 issued by the client 10A (or 10B) is received by the data relay server 100-1 where a part of retrieval conditions is encrypted, and a resultant is transferred as an encrypted query 115 to the DB server 119. At this time, an encryption program 116 is generated by the data relay server 100-1 as necessary and is transferred with the encrypted query 115 to the DB server 119.

The DB server 119 includes a network interface 120 connected to the network 23, a data management and retrieval system 124, and a database 126. In response to the query 115, the DB server 119 performs data retrieval, and transmits a response message 118 indicative of a retrieval result to the data relay server 100-1. The data relay server 100-1 performs a predetermined process on the retrieval result indicated by the response message 118, and transmits the resultant as a retrieval result 104 responding to the query 103 to the requester client computer 10A.

Figure 2:
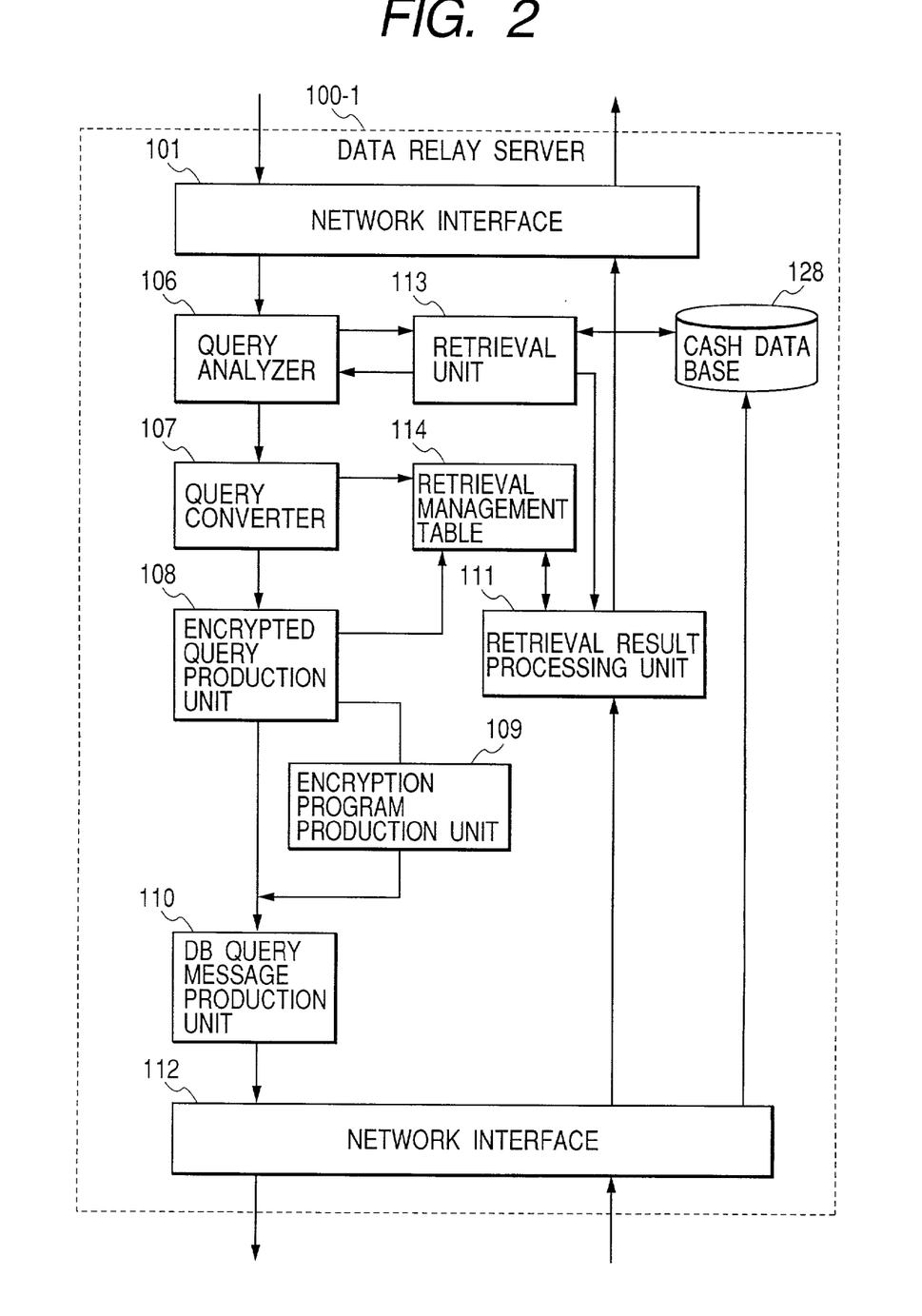
FIG. 2 is a block diagram showing the configuration of a data relay server 100-1 illustrated in FIG. 1.
Figure 3:
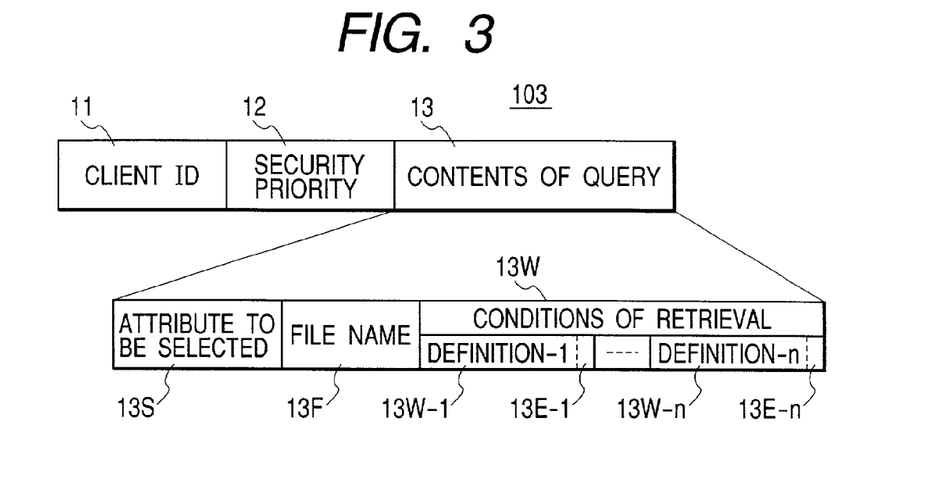
FIG. 3 is a diagram showing an embodiment of a query message transmitted from a client computer 10 (10A, 10B) to the data relay server 100-1 illustrated in FIG. 1.

FIG. 2 is a block diagram showing a detailed configuration of the data relay server 100-1 and FIG. 3 shows the contents of the query message 103.

The query message 103 issued by the client computer has a configuration of a data portion including a client ID 11, security priority 12, and contents of the query 13, and predetermined header information determined by a communication protocol of the network 21. The contents of the query 13 includes, for example, data attribute (data item name) 13S to be selected from the database, a name of a file 13F to be accessed, and retrieval conditions 13W. The retrieval conditions 13W include a plurality of definitions 13w-1 to 13w-n for specifying a data entry to be retrieved, and security indication 13E-1 to 13E-n prepared in association with the definitions.

The query 103 issued by the client computer 10A is received by a network interface 101 and analyzed by a query analyzer 106, and whether or not a retrieving process can be performed with data stored in a cache database 128 of the data relay server 100-1 is determined. For the analysis and determination, a method of using partial replica disclosed in Japanese Unexamined Patent Application No. 01-109758 (Japanese Patent Application No. 11-285164) may be applied. When the retrieving process can be performed with the data stored in the cache database 128, data adapted to the retrieval conditions is retrieved from the cache database 128 by a retrieval unit 113. The retrieval result is edited in the form of a response message by a retrieval result processing unit 111, and the response message is transmitted to the requester client computer via the network interface 101. When no cache database exists in the data relay server 100-1, or when it is determined that the query cannot be responded with the data stored in the cache database, the query message 103 is sent to a query converter 107.

Figure 6:
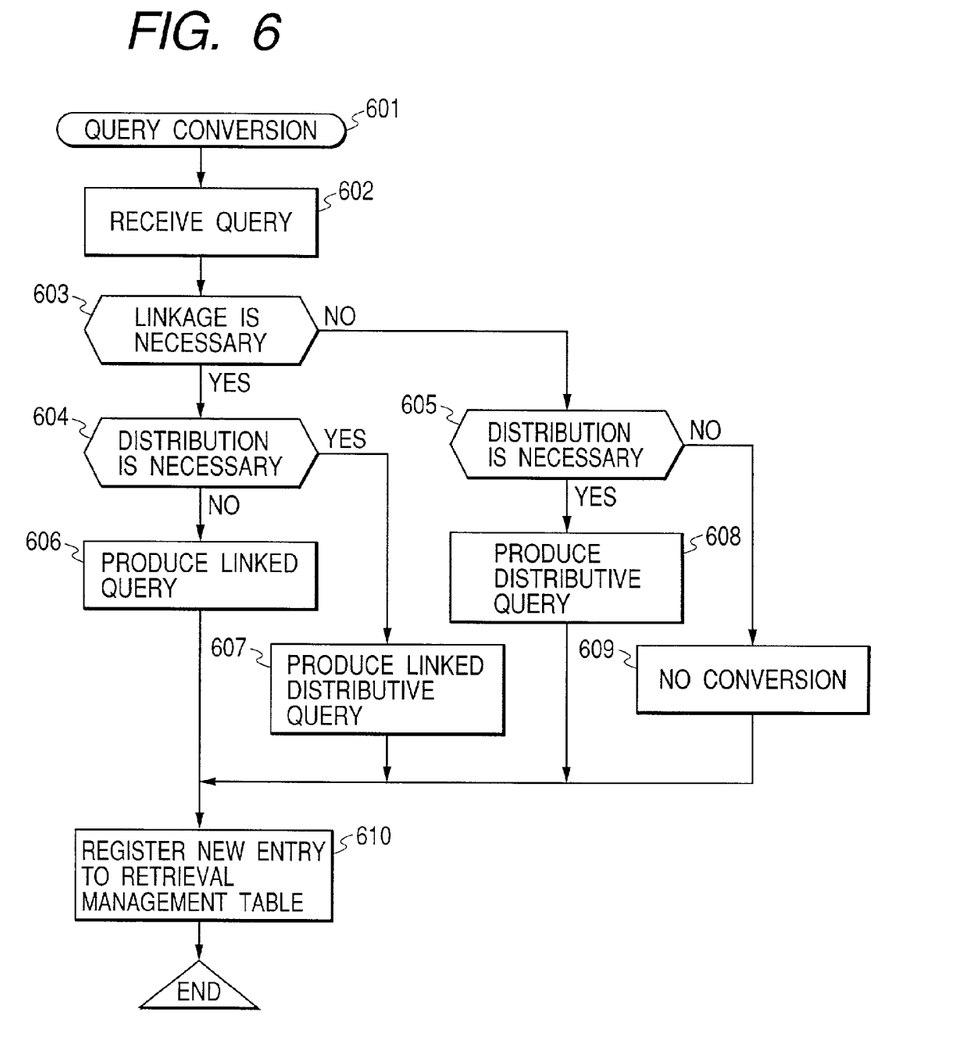
FIG. 6 is a flowchart showing the functions of a query converter 107 of the data relay server 100-1.

The operation of the query converter 107 will be described by referring to the flowchart of FIG. 6.

In the query converter 107, after the query message 103 is received (step 602), whether the query is to be linked or not is determined (step 603). The linkage of queries denotes a process of converting a plurality of queries into one query by linkage to conceal the contents of the queries. Not only queries issued by the same client computer but also queries issued by different client computers can be also the targets of linkage.

Figure 7A:
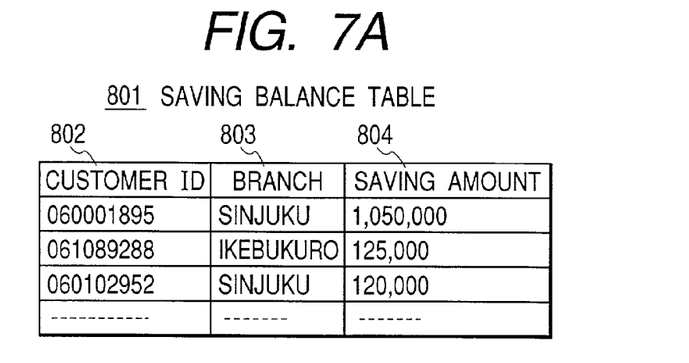
FIG. 7A is a diagram showing an example of the contents of a database of the DB server 119.

It is now assumed that data to be provided by the information providing system on the DB server 119 is a saving amount of a customer and, as shown in FIG. 7A, a saving balance table 801 indicating a branch name 803 in which a bank account is registered and a saving amount 804 in correspondence with a customer ID 802 is stored in the database 126.

Figure 7B:
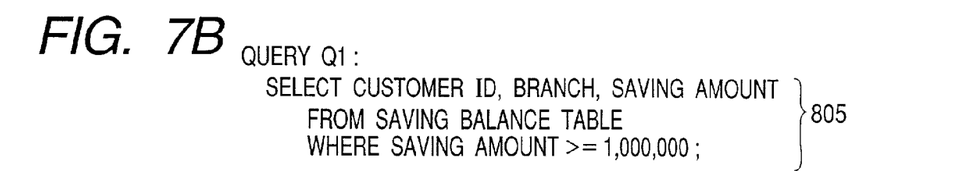
FIGS. 7B and 7C are diagrams showing an example of two queries Q1 and Q2, respectively, to the database illustrated in FIG. 7A.
Figure 7C:
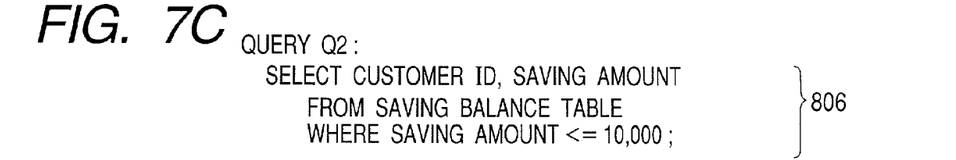

Assuming now that a query Q1 (805) shown in FIG. 7B is issued from the client computer 10A, and a query Q2 (806) shown in FIG. 7C is issued from the client computer 10B. In this case, the queries Q1 and Q2 are linked as follows. For example, as shown by reference numeral 807 in FIG. 7D, {customer ID, branch, and saving amount} as a sum-set of {customer ID, branch, and saving amount} as items (attributes) to be selected of Q1 and {customer ID and saving amount} as items to be selected of Q2 are used as data items to be selected. An OR of a retrieval condition {saving amount>=1,000,000} in the query Q1 and a retrieval condition {saving amount<=10,000} in the query Q2 is used as a retrieval condition. Whether the queries are linked or not is determined whether another query message which can be linked has been received or not.

After determining whether the linkage is necessary or not, whether query distribution is necessary or not is determined (steps 604 and 605). The query distribution denotes an operation of dividing a single query into a plurality of queries and distributive queries are transmitted from the plurality of data relay servers cooperating with each other to the DB server 119 in order to conceal the relation between the user who issued the query and the contents of the query.

Figure 7D:
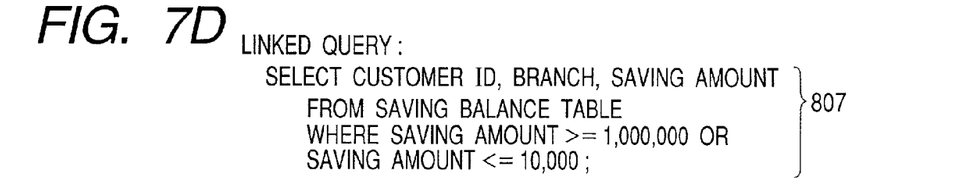
FIG. 7D is a diagram showing an example of a linked query generated by the query converter 107 in the data relay server 100-1.
Figure 7E:
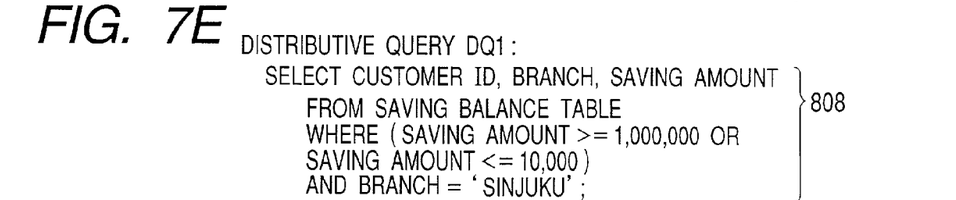
FIGS. 7E and 7F are diagrams each showing an example of a distributive query generated by the query converter 107 in the data relay server 100-1.
Figure 7F:
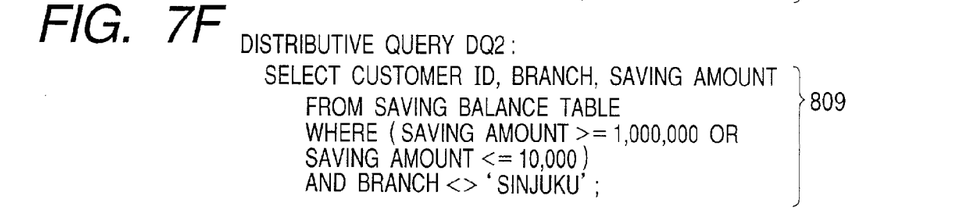

It is now assumed that a linked query 807 shown in FIG. 7D is a query to be distributed, and the data relay server 100-2 transfers a distributive query message to the DB server 119 in cooperation with the data relay server 100-1. In this case, the query 807 is divided into, for example, a distributive query DQ1 (808) shown in FIG. 7E and a distributive query DQ2 (809) shown in FIG. 7F. The distributive query DQ1 is sent from the data relay server 100-1 to the DB server 119. The distributive query DQ2 is transmitted via the data relay server 100-2 to the DB server 119. In such a manner, in the retrieval result to the query 807, a record of "Shinjuku" as branch is received as a response to the distributive query DQ1 by the data relay server 100-1. The other records are received by the data relay server 100-2 as a response to the distributive query DQ2 and transferred to the data relay server 100-1. By dividing one query into a plurality of distributive queries, the retrieving conditions and the issuer indicated by the query 807 can be concealed from the information providing system which operates on the DB server 119.

The query as a target of distribution may be a query before linkage. Whether the query distribution is necessary or not is determined by the security priority 12 in the received query message 103. When the security priority 12 does not instruct concealment of the contents of the query, the query distribution is not performed.

In the query converter 107, in the case of performing both query linkage and query distribution (YES in steps 603 and 604), a linked distributive query is produced (step 607). A new entry is registered in a retrieval management table 114 shown in FIG. 5 (step 610). After that, the query converting process is terminated. In the case where the query linkage is performed but distribution is not necessary (NO in step 604), a linked query is produced (step 606), and step 610 is executed. In the case where the linkage is not performed (NO in step 603) but only distribution is performed (YES in step 605), a distributive query is produced (step 608) and step 610 is executed. In the case where both linkage and distribution are not necessary (NO in step 605), step 610 is executed without performing the query conversion.

Figure 5:
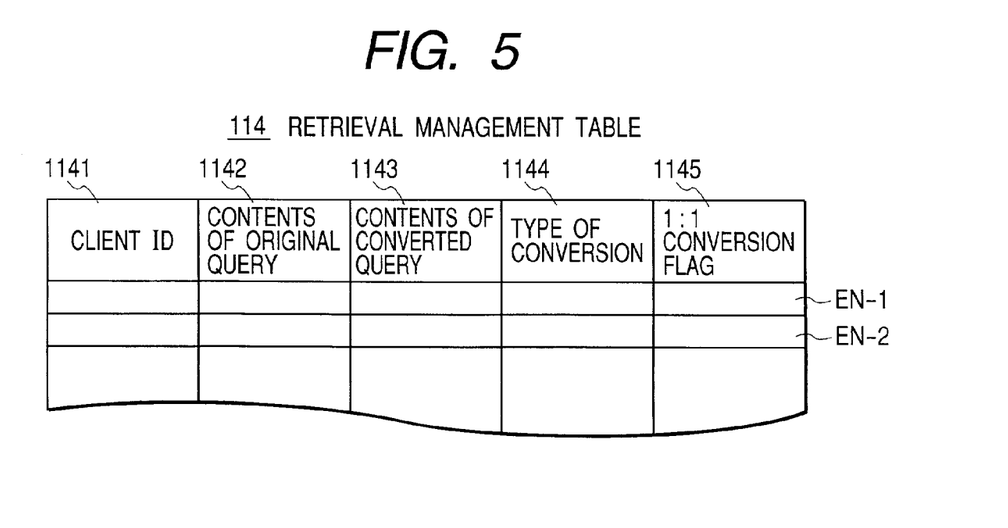
FIG. 5 is a diagram showing the configuration of a retrieval management table of the data relay server 100-1.

In the retrieval management table 114, as shown in FIG. 5, a plurality of entries EN-1, EN-2, . . . corresponding to query messages received by the data relay server 100-1 or query messages to be transmitted are registered. Each entry includes client ID 1141, contents of an original query 1142, contents of a converted query 1143, a type of conversion 1144 indicative of the kind of query conversion, and a 1:1 conversion flag 1145 indicating whether or not a retrieval definition encrypted by an encrypted query production unit 108 to be described hereinlater and the original retrieval definition have the relation of 1:1.

When two query messages M1 and M2 are linked, the same data is entered in the field 1143 in both the entry EN-1 corresponding to the message M1 and the entry EN-2 corresponding to the message M2. In the case where the contents of the single query message M1 is divided into two messages m1 and m2, the two entries EN-1 and EN-2 including the same contents in the field 1142 are produced. The message m1 is set in the field 1143 of the entry EN-1, and the message m2 is set in the field 1143 of the entry EN-2.

When the distributive query message is received from another data relay server 100-2, for example, the relation between the client ID included in the received message and the address of the transmitter (data relay server 100-2) included in the header of the received message is stored in a transfer message management table (not shown).

Referring again to FIG. 2, the query processed by the query converter 107 is transferred to the encrypted query production unit 108 and a part of the contents of the query is encrypted. In the case where an encryption method new to the DB server is used for encrypting the contents of the query, an encryption program corresponding to the encryption method is produced by an encryption program production unit 109. The encrypted query and the encryption program are edited into an encrypted query message destined for the DB server 119 shown in FIG. 1 by a DB query message production unit 110. The encrypted query message is transmitted to the network 23 shown in FIG. 1 via a network interface 112 and received by the DB server 119.

The operation of the encrypted query production unit 108 and that of the encryption program production unit 109 will be described by referring to FIGS. 8, 9, and 10.

Figure 8:
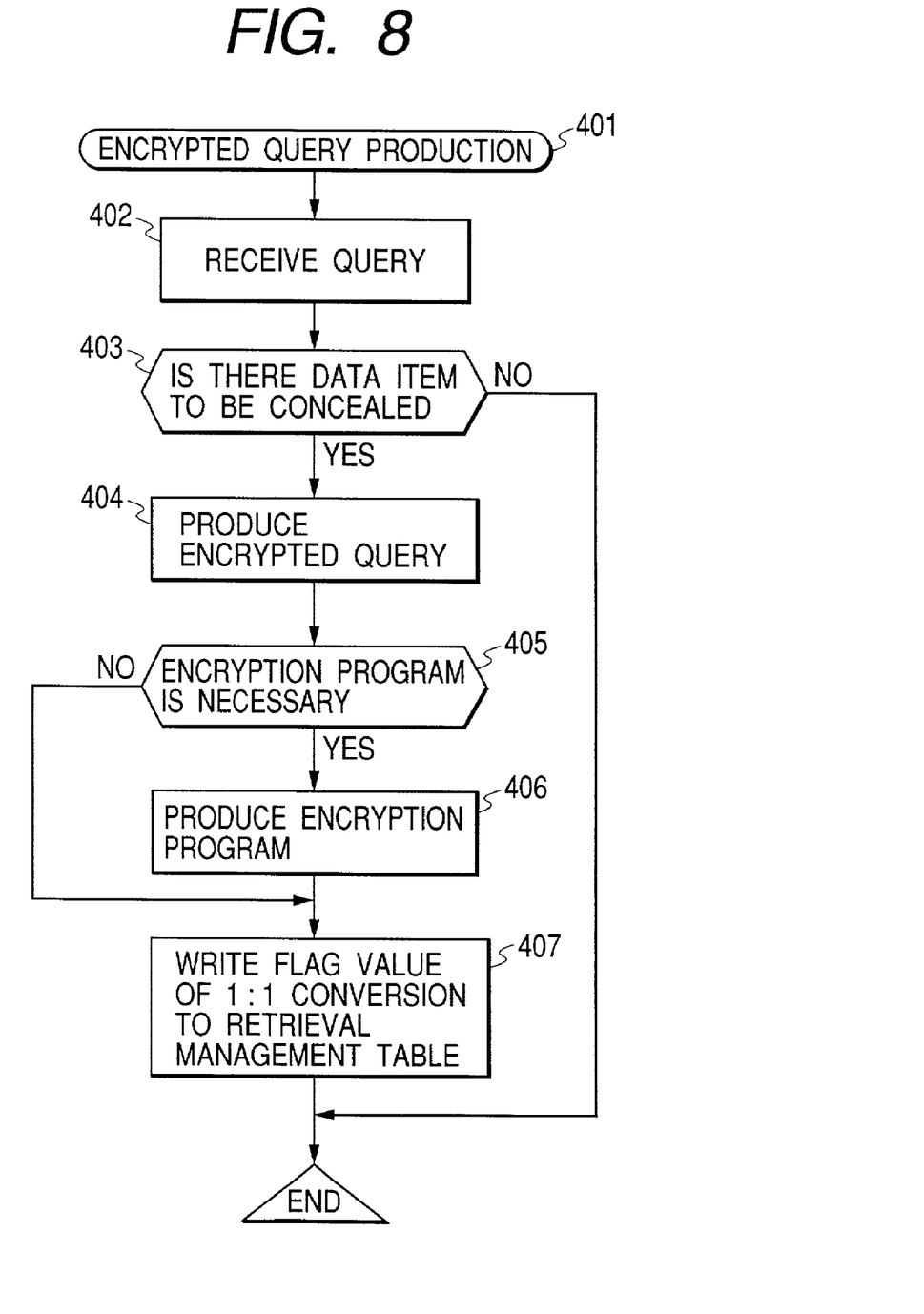
FIG. 8 is a flowchart showing the functions of an encrypted query production unit 108 in the data relay server 100-1.

As shown in FIG. 8, when a query message is received from the query converter 107 (step 402), the encrypted query production unit 108 determines whether or not a data item to be concealed exists in the query condition (step 403). The presence or absence of the data item to be concealed can be determined by checking the security indications 13E-1 to 13E-n each provided for a retrieval definition in the query message 103 in FIG. 3 received from the client 10 (10A, 10B). When there is no data item to be concealed, the process of the encrypted query production unit 108 is terminated without encrypting the query and producing an encryption program. When the data item to be concealed exits, data indicated by the condition definition 13W-i designated by the security indication 13E-i is encrypted in accordance with a predetermined encryption function fe( ), thereby producing an encrypted query including the encrypted data and the encryption function (step 404).

Figure 9A:
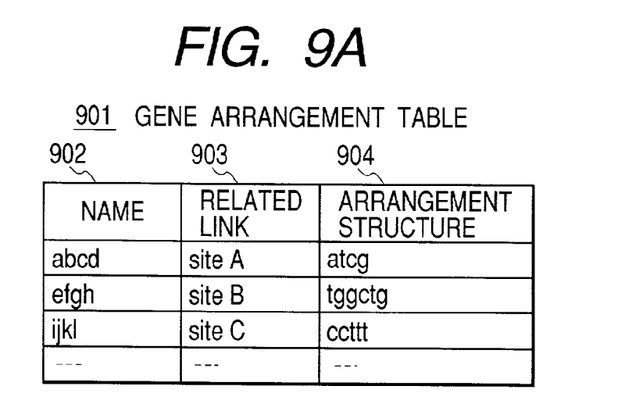
FIG. 9A is a diagram showing an example of the contents of a database.
Figure 9B:
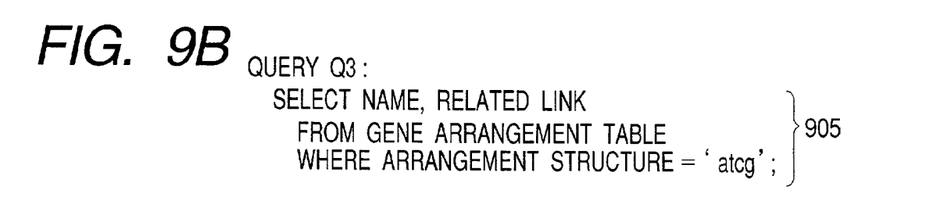
FIG. 9B is a diagram showing an example of a query Q3 to the database illustrated in FIG. 9A.

For example, it is assumed that the DB server 119 holds a gene arrangement table 901 shown in FIG. 9A in the database 126, and the encrypted query production unit 108 receives a query message Q3 (905) including an arrangement structure="atcg" as a retrieval condition as shown in FIG. 9B. The arrangement structure="actg" is described in the first condition definition 13W-1 in the query message Q3. If the security indication 13E-1 instructs security of the condition definition 13W-1, the data "atcg" is an item to be concealed.

Figure 9C:
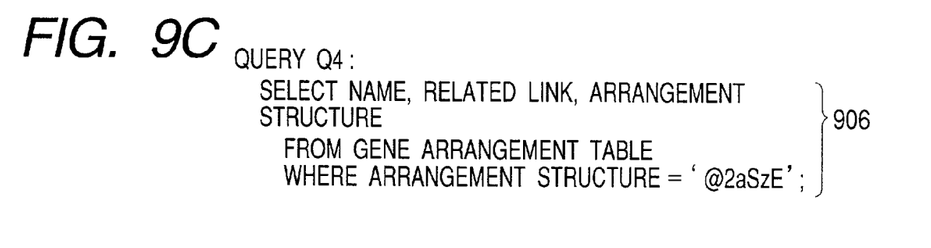
FIG. 9C is a diagram showing an example of an encrypted query obtained from the query Q3.

In this case, in step 404, the data "atcg" designated as the data item to be concealed is encrypted with a predetermined encryption function fe( ), and, for example, an encrypted query Q4 (906) as shown in FIG. 9C is produced. The encrypted query Q4 designates "@2aSzE" as an arrangement structure in the retrieval condition, and includes "arrangement structure" added as a new data item in a SELECT sentence for designating data to be fetched, for the following reason. That is, when it is not assured that the original data value "atcg" and encrypted data value "@2aSzE" have the 1:1 relation, it is necessary to make re-retrieval on the retrieval result received from the DB server by using the arrangement structure "atcg" as a retrieval condition on the data relay server side.

When the retrieval condition to be concealed includes an equal sign condition "=" or a sign of inequality "≠", the original data value can be converted with an arbitrary encryption function. When the retrieval condition to be concealed includes a sign of inequality such as "<", "≦", ">", or "≧", it is necessary to use an encryption method capable of holding the relation of the corresponding sign.

In the case of encrypting the retrieval condition, that is, producing an encrypted query, whether it is necessary to produce an encryption program or not is determined (step 405). When the data relay server 100-1 uses an existing encryption program registered in the encryption program server 129 or when the encryption program used in step 404 has already been notified to the DB server side, production of the encryption program is unnecessary. In this case, without producing an encryption program, the routine advances to step 407. If it is necessary to notify the DB server of the encryption program, in cooperation with the encryption program production unit 109, the encryption program is produced (step 406) and then step 407 is executed. In step 407, the presence or absence of 1:1 conversion, that is, a flag value indicating whether original data and encrypted data have the 1:1 relation or not is recorded in the 1:1 conversion flag field 1145 in the retrieval management table 114.

The encryption program will now be described by referring to FIG. 10.

Figure 10:
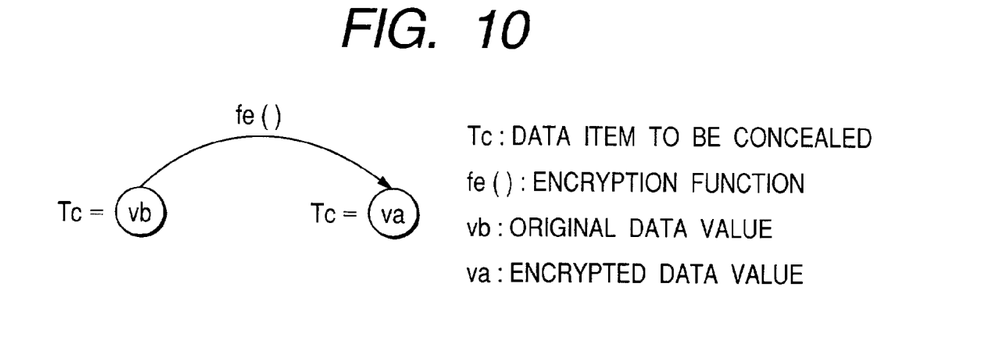
FIG. 10 is a diagram for explaining an encryption program produced by an encryption program production unit 109 in the data relay server 100-1.

When a data item or attribute to be concealed is expressed as Tc, a function used for encryption is expressed as fe( ), an original data value is indicated by vb, and an encrypted data value is described as va, the conversion of the query condition by encryption is schematically expressed as FIG. 10. An encryption program produced by the encryption program production unit 109 is a program for performing a data converting process corresponding to the encryption function fe( ), and is used by a data access unit 125 included in the data management and retrieval system (DBMS) 124 in the DB server 119.

When the DBMS 124 has a plug-in interface like HiRDB (TM) of Hitachi Limited, the encryption program may be a program satisfying the above-described interface specification. When the DBMS 124 has an engine for executing a programming language, a program described in the programming language may be used as the encryption program.

Referring again to FIG. 2, the encryption query production unit 108 sends the query message obtained by encrypting a part of the retrieval condition and, as necessary, changing the data item to be obtained together with a function identifier (encryption program identifier) applied for encryption to the DB query message production unit 110. In the case where the retrieval condition is not encrypted, the query message received from the query converter 107 is sent to the DB query message production unit 110. In the case where the encryption program is produced, the encryption program is passed from the encryption program production unit 109 to the DB query message production unit 110.

Figure 4:
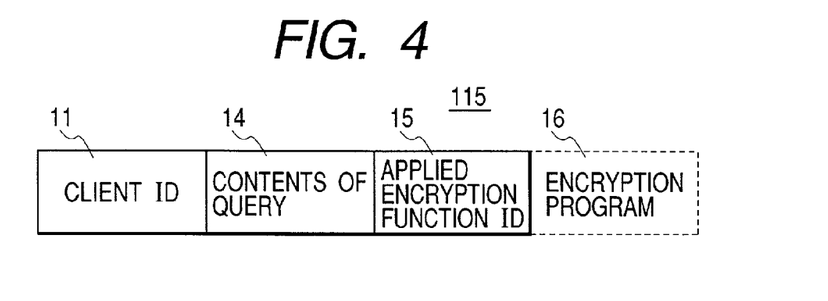
FIG. 4 is a diagram showing an embodiment of a query message transmitted from the data relay server 100-1 to a DB server 119 illustrated in FIG. 1.

On the basis of data received from the encryption query production unit 108, for example as shown in FIG. 4, the DB query message production unit 110 produces the encrypted query message (DB query message) 115 destined for the DB server 119 including the client ID 11, encrypted query contents 14, and applied encryption function ID 15 in the data portion, and transmits the produced query to the DB server 119 via the network interface 112. When the encryption program is produced, the encryption program 16 is added to the DB encrypted query message 115.

When the message received from the encrypted query production unit 108 has the same client ID as that of the immediately preceding reception message, the DB query message production unit 110 determines that the message is a message for distributive query and transmits the message to a pre-designated cooperative server, for example, the data relay server 100-2.

Figure 11:
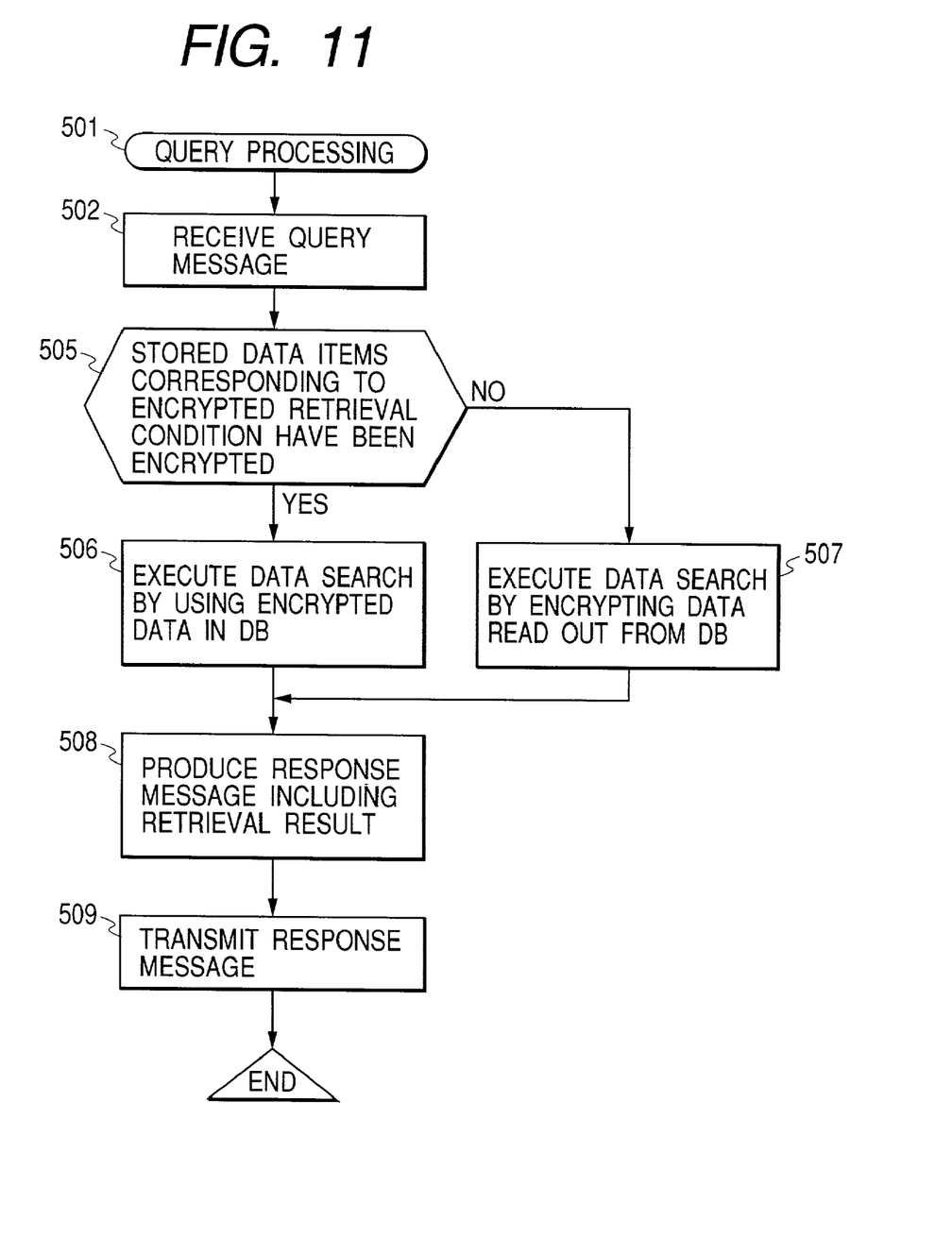
FIG. 11 is a flowchart showing an example of an query processing executed by the DB server 119.

The query process performed by the DB server 119 will now be described with reference to FIGS. 1 and 11.

In the DB server 119, the DB query message 115 received by the network interface 120 is analyzed by the DBMS 124 (step 502). When the encryption program 16 is included in the DB query message, it is set in the data access unit 125.

The DBMS 124 checks whether or not data corresponding to the encrypted retrieval condition in the DB query message 115 exists as encrypted data which can be collated with the retrieval condition on the DB server 119 side (database 126) (step 505). When the encrypted data already exists, the DBMS 124 instructs the data access unit 125 to read out the item to be concealed indicated by the retrieval condition of the DB query message, and executes the data retrieval process required by the DB query message by using the encrypted data (step 506).

If no encrypted data exists, the DBMS 124 instructs the data access unit 125 to read out data entries by designating the item to be concealed and the applied encryption function ID 15 indicated by the retrieval condition of the DB query message. The data access unit 125 encrypts the item to be concealed in the data read out from the database 126 by the encryption program corresponding to the encryption function ID 15, and outputs the other data items in a normal data format. The DBMS 124 checks the data read out from the database in accordance with the retrieval condition of the query message, and retrieves data records matching the retrieval condition while comparing the encrypted data of the item to be concealed with the retrieval condition (step 507).

For example, when the query message 115 includes the encrypted query Q4 shown in FIG. 9C as the retrieval conditions and the encryption program fe1( ), the DBMS 124 executes the retrieving process without decrypting the encrypted data included in the query Q4. At the time of reading out an arrangement structure 904 from the gene arrangement table 901 stored in the database 126, the data access unit 125 is controlled to output the stored data of the arrangement structure in the encrypted format by the function fe1( ) to retrieve a record matching the arrangement structure of "@2aSzE" indicated by the retrieval condition.

The DBMS 208 produces a response message including the retrieval result (step 508), transmits the response message to the data relay server 100-1 or 100-2 as the transmission source of the query message 115 (step 509), and the query process is terminated. The response message produced by the DBMS 124 is transferred to the network and the data relay server via the network interface 120 as shown by reference numerals 18 and 118 in FIG. 1.

It is also possible to produce the response message by automatically encrypting a data item which is not encrypted in data items included in the retrieval result by the DBMS 124. Although the retrieval condition and the encryption program are simultaneously transmitted by the query message 115 in the embodiment, it is also possible to transmit only the retrieval condition and a function ID applied to encryption by the query message 115, check whether the encryption program corresponding to the function ID has already held on the DB server 119 side or not and, if the necessary encryption program is not held, send a request of transmission of the encryption program from the DB server 119 to the transmitter server 100-1 or 100-2 which is the source of the query message 115.

The data relay server 100-1 processes the retrieval result in the response message received via the network interface 112 by the retrieval result processing unit 111.

Figure 12:
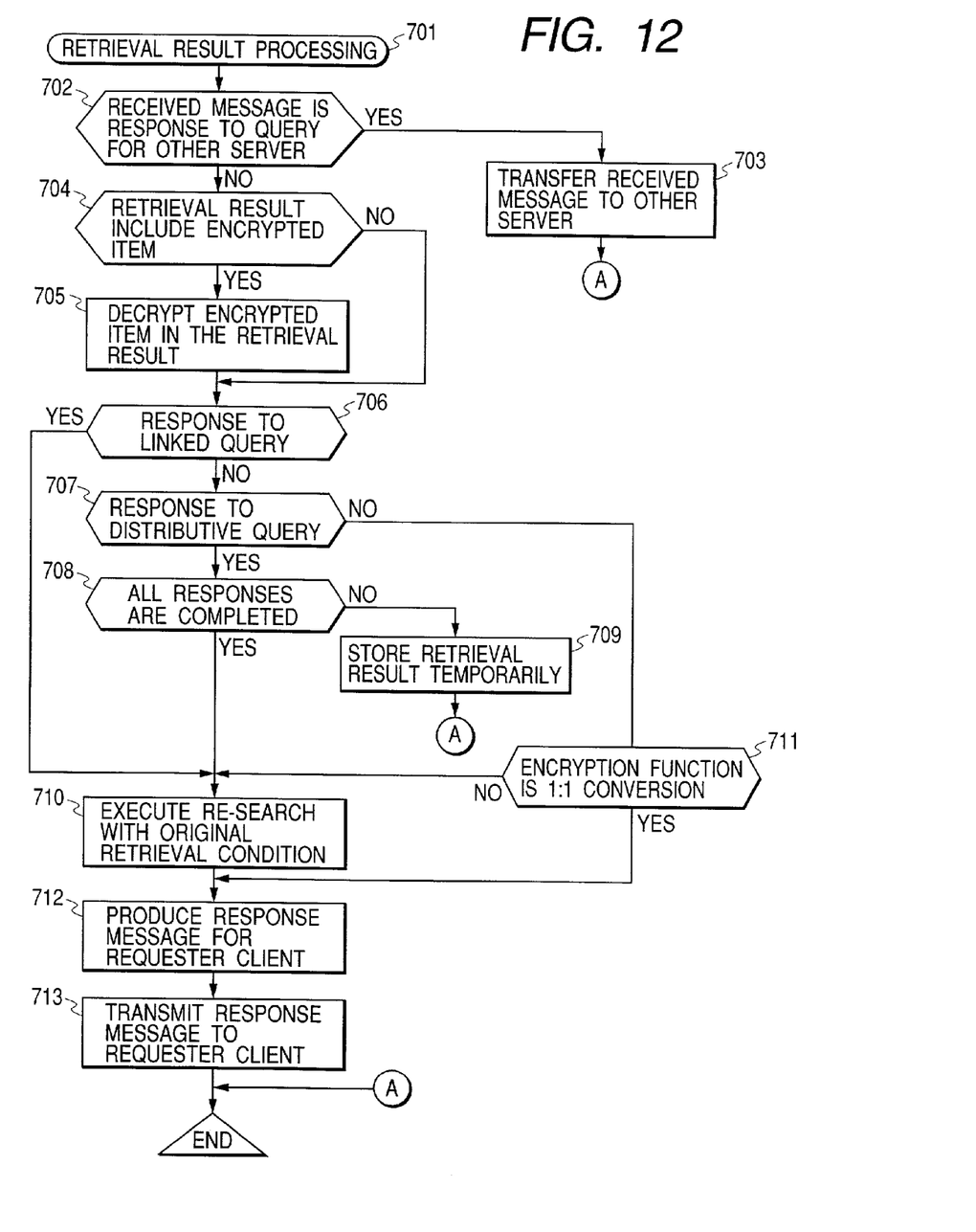
FIG. 12 is a flowchart showing the functions of a retrieval result processing unit 111 in the data relay server 100-1.

FIG. 12 shows a retrieval result processing routine 701 executed by the retrieval result processing unit 111.

The retrieval result processing unit 111 refers to the transfer message management table on the basis of the client ID included in the received response message and determines whether the response message is a response to the query sent by another cooperative server or not (step 702). If the received response message is a message replying to the query sent from the other cooperative server, the response message is transferred to the address of the data relay server designated by the transfer message management table (step 703), and the routine is terminated.

When the received response message is a response to the query produced by the data relay server 100-1, the retrieval management table 114 shown in FIG. 5 is referred to on the basis of the client ID included in the received response message, and a check is made to see whether the encrypted data item is included in the retrieval result or not (step 704). When the encrypted data item is included, the encrypted data item is decrypted (step 705).

Subsequently, by referring to the retrieval management table 114, a check is made to see whether the received response message is a response to the linkage query or not (step 706). If the received response message is a response to the linkage query, re-search is executed by applying the retrieval condition before the linkage conversion indicated by the contents 1142 of the original query in the retrieval management table 114 to produce the correct retrieval result to the query issued by each client computer (step 710). After that, a response message destined for the requester client computer included in the re-search result is produced (step 712) and transmitted to the network 21 via the network interface 101 (step 713).

When the received response message is not a reply to the linkage query, a check is made to see whether the received response message is a reply to the distributive query or not (step 707). In the case where the received response message is a response to the distributive query, whether all responses (retrieval results) to the distributive query are completed or not is checked (step 708). When all the responses are completed, in step 710, re-search is executed by applying the retrieval condition before the distributive conversion indicated by the contents 1142 of the original query in the retrieval management table 114. When all responses to the distributive query are not completed yet, the retrieval result is stored in a temporary storage area in the distributive query retrieval result prepared on a work memory (step 709), and the routine is terminated. The check in step 708 is made by referring to the temporary storage area in the distributive query retrieval result.

When the determination result in step 707 is NO, it means that the retrieval result is a response to the query which has not been converted by the query converter 107. In this case, whether the encryption function adapted to the retrieval condition of the query is a function for 1:1 conversion or not is determined (step 711). When the encryption function is not for the 1:1 conversion, it means that data of two or more different values becomes data of the same value by the encryption, and a retrieval result obtained by the encrypted retrieval condition is a solution set larger than the retrieval result obtained by the retrieval condition which is not encrypted. In this case, re-search is executed with the original retrieval condition indicated by the contents 1142 of the original query in the retrieval management table 114 on the retrieval result notified from the DB server (step 710), thereby producing a correct retrieval result to the query issued from the client computer.

In the case where the encryption function is for the 1:1 conversion, according to the retrieval result notified from the DB server, the response message for the requester client computer is produced (step 712), and the response message is transmitted to the network 21 (step 713).

As obvious from the foregoing embodiment, according to the invention, information providing service highly assuring the security of the confidential condition included in a query of the user can be provided. By the invention, the user of each client computer can receive the information providing service while concealing the conditions desired to be protected, and the confidentiality of the user can be protected from an ill-intentioned manager of a DB server.

The data relay server according to the invention can be applied to, for example, a query relay service method for selectively transferring a query from the user only to an information providing server capable of assuring the security of a confidential condition included in the query. The data relay server of the invention can be also applied to, for example, information service of collecting service charge information from a plurality of information providing servers, paying a counter value for the information providing servers, dividing the charging information by the clients, and charging each client for the service.

What is claimed is:

1. A data relay server for accessing a database server via a communication network in accordance with a query for a database received from a client computer, comprising:

first means for encrypting retrieval condition data included in a query received from the client computer;

second means for producing a query message destined for said database server, including the retrieval condition data encrypted by said first means and an identifier of an encryption function used to generate the encrypted retrieval condition data;

third means for transmitting the query message produced by said second means to said communication network;

fourth means for receiving from said database server via said communication network, as a retrieval result, data matched with the encrypted retrieval condition data retrieved by matching the data with the encrypted retrieval condition data, wherein the matching is performed by encrypting at least one data item read out from a database in said database server using the encryption function designated by the identifier in the query message and comparing the encrypted at least one data item to the encrypted retrieval condition data; and fifth means for producing a response message for the client computer based on the retrieval result received by said fourth means and transferring the response message to the client computer.

2. The data relay server according to claim 1 wherein the query received from said client computer designates at least one data item to be replied as a retrieval result, and wherein the query message produced by said second means includes, as data items to be replied as a retrieval result, not only the data item designated by the query from said client computer but also a data item corresponding to the encrypted retrieval condition data.

3. The data relay server according to claim 2, wherein said fifth means has means for re-searching the retrieval result received by said fourth means with the retrieval condition data included in the query received from said client computer, and said response message for said client computer indicates a result of said re-search.

4. The data relay server according to claim 2, further comprising:

sixth means for converting at least two queries received from different client computers into a linked query and supplying the linked query to said first means, wherein said fifth means re-searches the retrieval results for said linked query received from said database server for data matched with the retrieval condition indicated by the original query issued by each of said client computers and produces a response message to each client computer.

5. The data relay server according to claim 2, further comprising:

sixth means for converting one query received from a client computer into at least two distributive queries and supplying the distributive queries to said first means, wherein said second means converts one of the distributive queries including the retrieval condition data encrypted by said first means into a query message for said database server, and converts the other distributive query to a query message for a pre-designated another data relay server, and wherein said fifth means re-searches a retrieval result for the one of distributive queries received from said database server and a retrieval result for the other distributive query received from said another data relay server for data matched with the retrieval condition data indicated by the original query issued by said client computer, and produces a response message for the client computer.

6. The data relay server according to claim 1, wherein the query message produced by said second means includes identification information of an encryption program for encrypting the retrieval condition data.

7. The data relay server according to claim 1, wherein the query message produced by said second means includes an encryption program for encrypting the retrieval condition data.

8. The data relay server according to claim 1, further comprising:

sixth means for converting at least two queries received from different client computers into a linked query and supplying the linked query to said first means, wherein said fifth means re-searches the retrieval results for said linked query received from said database server for data matched with the retrieval condition indicated by the original query issued by each of said client computers and produces a response message to each client computer.

9. The data relay server according to claim 1, further comprising:

sixth means for converting one query received from a client computer into at least two distributive queries and supplying the distributive queries to said first means, wherein said second means converts one of the distributive queries including the retrieval condition data encrypted by said first means into a query message for said database server, and converts the other distributive query to a query message for a pre-designated another data relay server, wherein said fifth means re-searches a retrieval result for the one of distributive queries received from said database server and a retrieval result for the other distributive query received from said another data relay server for data matched with the retrieval condition data indicated by the original query issued by said client computer, and produces a response message for the client computer.

10. A database server for executing information retrieval in response to a query message received from a communication network, comprising:

a database in which service information is stored; and a database management system for searching said database for service information matched with a retrieval condition designated by said query message, wherein said database management system comprises:

means for encrypting a specific data item designated by said retrieval condition and read out from said database when said query message includes encrypted retrieval condition data and an identifier of an encryption program used to generate the encrypted retrieval condition data, and retrieving service information matched with said retrieval condition by matching the encrypted specific data item to the encrypted retrieval condition data, wherein the specific data item is encrypted using the encryption program identified by said identifier; and means for transmitting a response message including the retrieved service information to the source of said query message.

11. A database access method comprising the steps of:

encrypting at least a part of a retrieval condition designated by a client, said at least part of said retrieval condition being retrieval condition data;

transmitting a query message including the retrieval condition, the encrypted retrieval condition data and an identifier of an encryption program used to generate the encrypted retrieval condition data to a server having a database;

encrypting, in said server, a specific data item, which is designated by said retrieval condition and read out from said database, and retrieving service information matched with said retrieval condition by matching the encrypted specific data item to the encrypted retrieval condition data, wherein the specific data item is encrypted using the encryption program identified by said identifier; and transmitting, as a retrieval result, the service information matched with said retrieval condition from said server to the source of said query message.

12. The database access method according to claim 11, further comprising a step of:

re-searching, by the source of said query message, the retrieval result received from said server in accordance with the retrieval condition designated by said client, wherein the retrieval result received by the server includes a data item corresponding to the encrypted retrieval condition data.

* * * * *